W. C. HARLEY.
ADJUSTABLE ROPE FASTENER.
APPLICATION FILED MAY 2, 1921.

1,408,940.

Patented Mar. 7, 1922.

Inventor
Walter C. Harley.

By Harry A. Schweda
Attorney

UNITED STATES PATENT OFFICE.

WALTER C. HARLEY, OF OAKLAND, CALIFORNIA.

ADJUSTABLE ROPE FASTENER.

1,408,940.  Specification of Letters Patent.  Patented Mar. 7, 1922.

Application filed May 2, 1921. Serial No. 466,172.

*To all whom it may concern:*

Be it known that I, WALTER C. HARLEY, a citizen of the United States, residing at Oakland, in the county of Alameda and State of California, have invented certain new and useful Improvements in Adjustable Rope Fasteners, of which the following is a specification.

My invention is an adjustable rope hitch constructed to be readily adjusted along the rope and to receive a hook on the end of the rope to form a loop on the rope of any size.

Referring to the annexed drawing in which my invention is illustrated and which forms a part of this specification:

My hitch includes a cylindrical tube 1 bent spirally in the form of an eye 2 with its ends extending tangentially in alignment with each other from said eye.

Figure 1:
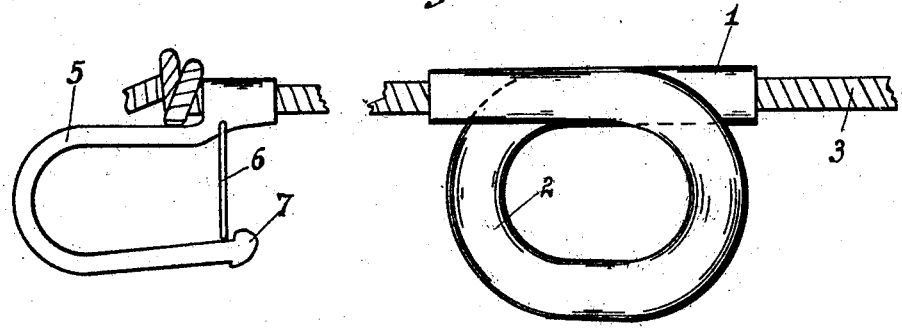
Figure 1 is a front view of my invention.
Figure 2:
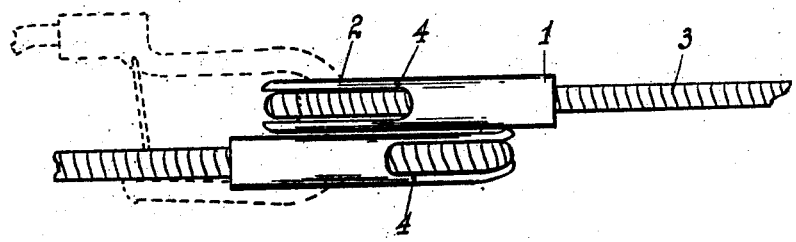
Figure 2 is a side view of my invention looking in the direction of arrow 2.
Figure 3:
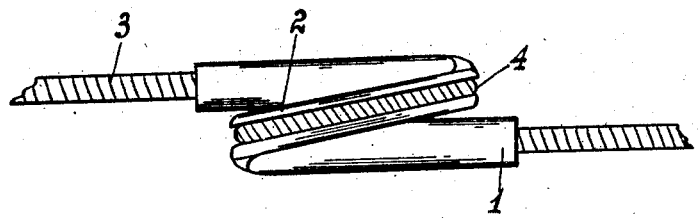
Figure 3 is a side view of my invention looking in the direction of arrow 3.

The rope 3 is inserted through the tube 1. The wall of the tube at the outer side of the eye 2 is cut away as indicated at 4 so that the rope may slide easily in the tube around the eye. On the end of the rope 3 is connected a hook 5 on the shank of which is pivoted a latch member 6 which swings across the entrance of the hook against a lug 7 on the extremity of the hook and closes said entrance. The hook 5 is hooked into the eye 2, forming a loop in the rope, and the hook is prevented from disengaging said eye by the latch member 6 engaging the lug 7. (See Fig. 2).

The hitch may be readily shifted along the rope to adjust the size of the loop, but binds on the rope when a pull is exerted by the hook 5 on the eye 2 from the loop.

Having described my invention, I claim:

1. A rope loop hitch including a tube bent spirally into an eye with the ends of the tube extending tangentially from said eye.

2. A rope loop hitch including a tube bent in the form of an eye through which tube the rope extends, the outside of the tube being cut away around the loop.

In testimony whereof I affix my signature.

WALTER C. HARLEY.